Feb. 13, 1923.

C. F. TUCKER 1,444,814

TIRE ARMOR

Filed May 19, 1921

Inventor
C. F. Tucker
By C. A. Snow & Co.
Attorneys

Patented Feb. 13, 1923.

1,444,814

UNITED STATES PATENT OFFICE.

CALVIN F. TUCKER, OF KANSAS CITY, MISSOURI.

TIRE ARMOR.

Application filed May 19, 1921. Serial No. 470,860.

*To all whom it may concern:*

Be it known that I, CALVIN F. TUCKER, a citizen of the United States, residing at Kansas City, in the county of Jackson and State of Missouri, have invented a new and useful Tire Armor, of which the following is a specification.

This invention relates to tire armor one of its objects being to provide efficient means whereby segmental sections of tire casings can be fastened securely upon the tread portion of a pneumatic tire so as to receive practically all of the wear and tear to which the tire casing would ordinarily be subjected.

Another object is to provide an armor of this character which can be easily applied to a tire or removed therefrom.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Referring to the figures by characters of reference R designates a portion of a wheel rim engaged by a tire casing C such as ordinarily employed.

Figure 1:
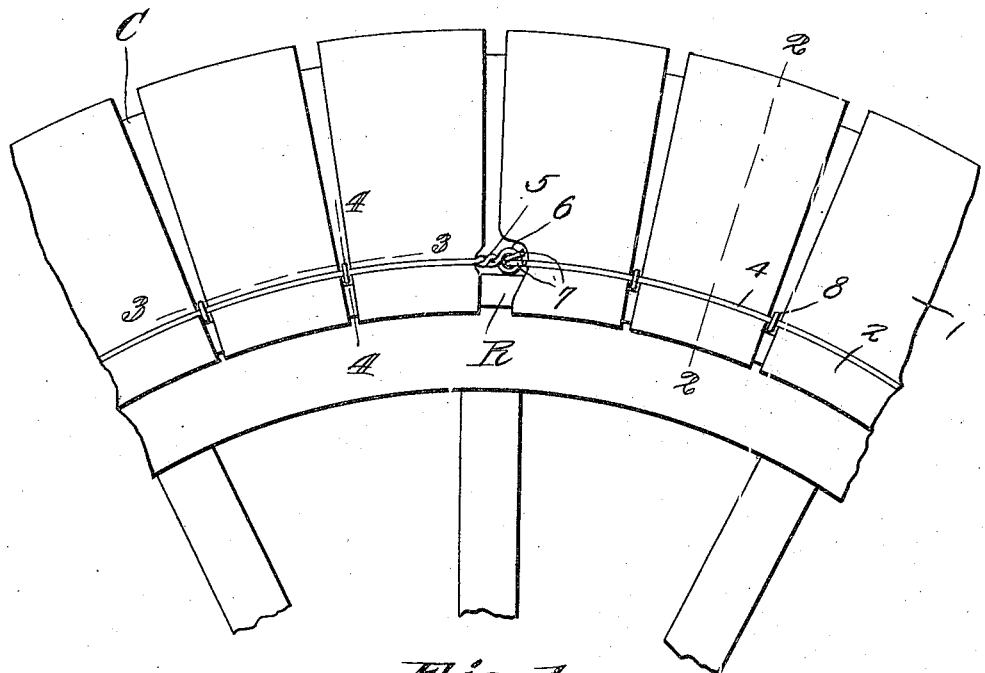
Figure 1 is a side elevation of a portion of a wheel and tire with a portion of the improved armor applied thereto.
Figure 2:
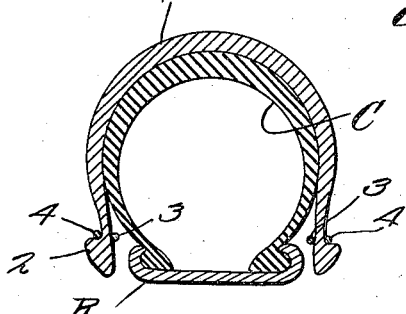
Figure 2 is a section on line 2—2, Figure 1.
Figure 3:
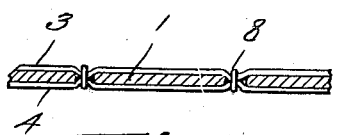
Figure 3 is a section on line 3—3, Figure 1.
Figure 4:
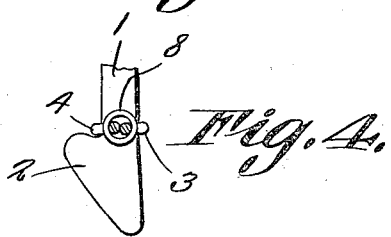
Figure 4 is a section on line 4—4, Figure 1.

The armor constituting the present invention is made up of a series of segmental sections 1 cut from tire casings and which sections are adapted to straddle the casing C and lap the sides of the rim R with the beads 2 extending outwardly as shown particularly in Figure 2. Arranged along the inner surface of each of the segmental sections at one side is a wire strand 3 and another strand 4 extends along the outer surface of each section at one side, both of these strands extending throughout the length of the annular series of segments and one pair of strands 3 and 4 being provided at each side of the armor as shown. The strands of each pair merge at one end into a twisted portion 5 forming a neck which terminates in an eye 6. The other ends of the strands of each pair are free and bendable and after the armor has been applied to a tire the free ends of the strands of each pair are adapted to be inserted outwardly through the eye 6 belonging to said pair and then to be bent backwardly to form hooks as indicated at 7 in Figure 1. For the purpose of holding the segmental sections properly spaced and to maintain the strands in engagement with the beads 2, spacing rings 8 are mounted on the strands of each pair and extend between the segmental sections 1 as shown in Figures 1 and 3.

It is to be understood of course that the various parts of the armor are properly assembled when sold to the trade and all that is necessary in order to apply the armor to a tire is to mount the segmental sections on the tire while the tire is deflated, insert the free ends of the strands outwardly through the eyes 6 and then to bend said ends backwardly to form hooks. To remove the armor the foregoing operation can be reversed.

What is claimed is:—

1. A tire armor consisting of an annular series of segmental sections of a tire casing, a single length of wire at each side of the armor, each length of wire being doubled at its center and twisted to provide a terminal eye, and an elongated loop, one strand of the loop being extended along the inner faces of the segmental sections at one side thereof and the other strand of the loop being extended along the outer face of said section at one side of the armor, the free ends of the strands being insertible through and hooked within the eye to hold the segmental sections assembled about a tire, and means engaging the strands of the loop at points between the sections for holding the strands in engagement with the sections.

2. Tire segments, a continuous strand of wire gripping the bead of the segments on opposite sides, and means gripping the opposite portions of the wire between tire segments.

3. A series of tire segments, a continuous strand of wire gripping the series of beads of the tire segments on opposite sides and formed in two circular portions, the ends of the wire gripping the middle thereof.

In testimony that I claim the foregoing as my own, I have hereto affixed my signature in the presence of two witnesses.

CALVIN F. TUCKER.

Witnesses:
  A. L. TUCKER,
  T. H. CONDON.